(12) United States Patent
Nozaki

(10) Patent No.: US 6,811,199 B2
(45) Date of Patent: Nov. 2, 2004

(54) BRACKET CONSTRUCTION FOR SEAT STRIKER

(75) Inventor: Kenichi Nozaki, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 10/455,851

(22) Filed: Jun. 6, 2003

(65) Prior Publication Data

US 2003/0230908 A1 Dec. 18, 2003

(30) Foreign Application Priority Data

Jun. 18, 2002 (JP) ........................................ 2002-176617

(51) Int. Cl.[7] ................................................. B66N 2/02
(52) U.S. Cl. ................ 296/63; 296/65.16; 297/378.13; 248/503.1; 280/808
(58) Field of Search .............................. 296/65.16, 68.1, 296/63, 65.01; 297/378.13; 248/503.1; 280/801.2, 807, 808

(56) References Cited

U.S. PATENT DOCUMENTS

| 4,475,763 | A | * | 10/1984 | Hamatani et al. | ........ 296/65.09 |
| 4,639,040 | A | * | 1/1987 | Fujita et al. | ........... 297/378.13 |
| 4,866,820 | A | * | 9/1989 | Hassmann | .................... 24/628 |
| 5,741,046 | A | * | 4/1998 | Leuchtmann et al. | .. 297/378.13 |
| 5,762,401 | A | * | 6/1998 | Bernard | ................. 297/378.13 |
| 6,312,055 | B1 | * | 11/2001 | Uematsu | ................ 297/378.13 |
| 6,508,500 | B2 | * | 1/2003 | Bowers | ...................... 296/68.1 |

FOREIGN PATENT DOCUMENTS

| JP | 61-191453 | * | 8/1986 |
| JP | 9-202194 | * | 8/1997 |
| JP | 11-115597 | * | 4/1999 |

* cited by examiner

Primary Examiner—Joseph D. Pape
(74) Attorney, Agent, or Firm—Trop, Pruner & Hu, P.C.

(57) ABSTRACT

The present invention provides a bracket construction for a seat striker, which can firmly hold the seat striker at a position separated from the vehicle body side. A latch 18 having a pin 18a is provided in a folding type squab 10, and a slot 10b is formed in a back face 10a thereof. A bracket 1 is installed to a side panel 13 by bolting. The bracket 1 has a bracket body 2 and a seat striker 3 that is installed to the bracket body 2 so as to be capable of being engaged with the latch 18. The bracket body 2 has a shape such as to project toward the vehicle inside from an outside end 10c of the squab 10 and be long in the vehicle longitudinal direction. The bracket body 2 consists of an upper bracket 2a and a lower bracket 2b. The bracket body 2 has a seat belt guide portion 5, and further has an installation portion for a trim 4 which covers the bracket body 2.

8 Claims, 10 Drawing Sheets

BRACKET CONSTRUCTION FOR SEAT STRIKER

FIELD OF THE INVENTION AND RELATED ART STATEMENT

The present invention relates to a vehicle body construction of an automobile and, more particularly, to a bracket construction for a seat striker installed to a vehicle body (cabin side).

In the case of a folding type seat in which a seat back (hereinafter referred to as a squab) can be folded forward to enlarge a cargo room of an automobile, the squab must be fixed at a position at which a passenger is usually seated so that the squab is prevented from moving.

For this purpose, as shown in FIG. 11, usually, a latch (not shown in the figure) is provided on the squab side, and an engagement device called a striker 21 is provided on the vehicle body side. By engaging the striker 21 with the latch, the squab is fixed. The striker 21 is usually formed of a steel round bar, and is installed to the inside at the side of vehicle body with bolts 22 or fixed thereto by welding. However, if a heavy article at the rear of the seat (for example, in the cargo room) is moved forward by a collision of vehicle or other causes, a strong force is applied to the squab. In such a case, the round bar shaped striker engaging at the side end of squab causes deformation of the squab and thus causes an increase in displacement of the squab.

In order to strengthen the holding of the squab, a strong stick-shaped striker is sometimes used. However, since the construction is such that the striker sticks in a part of the squab, the latch is located at a position on the slightly inner side (in the direction of the vehicle centerline) from the side end of the squab. Therefore, it is difficult to provide a strong bracket, which is used to support the striker located apart from the vehicle body side, at the vehicle body side.

On the other hand, in a lap and diagonal seat belt 15 shown in FIG. 11, the positions of a belt take-up device (seat belt retractor) 26 provided at a lower part of the side of a vehicle body and a junction (seat belt retractor) at an upper part of the side of a vehicle body (roof) differ greatly from each other in the vehicle width direction (transverse direction). Therefore, when a belt line of the seat belt 15 exerts an influence upon interior parts or a passenger, a belt guide 23 for regulating the belt line of the seat belt 15 must be installed on a side panel 13 with screws 24.

When an interior trim part 27, which is installed at the vehicle body side, considerably projects toward the cabin side and further the construction such as to support a heavy article such as a luggage board (parcel shelf) is provided, a bracket 25 for holding the interior trim part 27 must be provided on the side panel 13.

OBJECT AND SUMMARY OF THE INVENTION

The present invention has been made in view of the above situation, and accordingly an object thereof is to provide a bracket construction for a seat striker, which can firmly hold the seat striker at a position distant from the vehicle body side. Also, another object of the present invention is to provide a bracket construction for a seat striker, which can omit various parts.

To achieve the above object, the present invention provides a bracket construction for a seat striker, which comprises a bracket body installed to the vehicle body side in a cabin and a seat striker installed to the bracket body, the seat striker being connected detachably to a folding type squab to fix the squab, wherein the bracket body projects toward the vehicle inside from the outside end of the squab and extends toward the rear of vehicle from the installation position of the seat striker so that it is long in the vehicle longitudinal direction. The bracket body is formed by connecting an upper member and a lower member to each other.

The bracket body has a seat belt guide portion. The seat belt guide portion has an upper guide and a lower guide which are separated from each other in the lengthwise direction of the seat belt, and both of these guides can come into contact with the seat belt. Both of the upper guide and lower guide, which can come into contact with the seat belt, each have a flange shape bent into an arcuate shape in the direction such as to be separated from the seat belt. The bracket body is provided with a trim installation portion which covers the vehicle body side so that the trim covers the bracket body.

Since the bracket body projects toward the vehicle inside from the outside end of the squab and is long in the vehicle longitudinal direction, the seat striker can be held at a vehicle inside position separated from the vehicle body side, and further the squab can be held firmly. Therefore, even if a force is applied to the vehicle body, the squab can withstand the force, and the displacement of squab can be kept small.

If the bracket body is formed by connecting the upper member and the lower member to each other, the workability can be improved.

If the configuration is such that the bracket body has the seat belt guide portion, a seat belt guide function can be added to the bracket body without addition of parts.

If the configuration is such that the seat belt guide portion has the upper guide and the lower guide which are separated from each other in the lengthwise direction of the seat belt, the seat belt can be guided at the upper and lower positions of the bracket, so that the seat belt can be slid smoothly.

If the configuration is such that both of the upper guide and lower guide, which can come into contact with the seat belt, each have a flange shape bent into an arcuate shape in the direction such as to be separated from the seat belt, the contact portion of seat belt is in face-to-face contact, so that the seat belt can be prevented from being damaged.

If the bracket body is provided with the trim installation portion which covers the vehicle body side, a trim support function can be added without addition of parts.

DETAILED DESCRIPTION OF PREFERRED EMBODIMENTS

Figure 1:
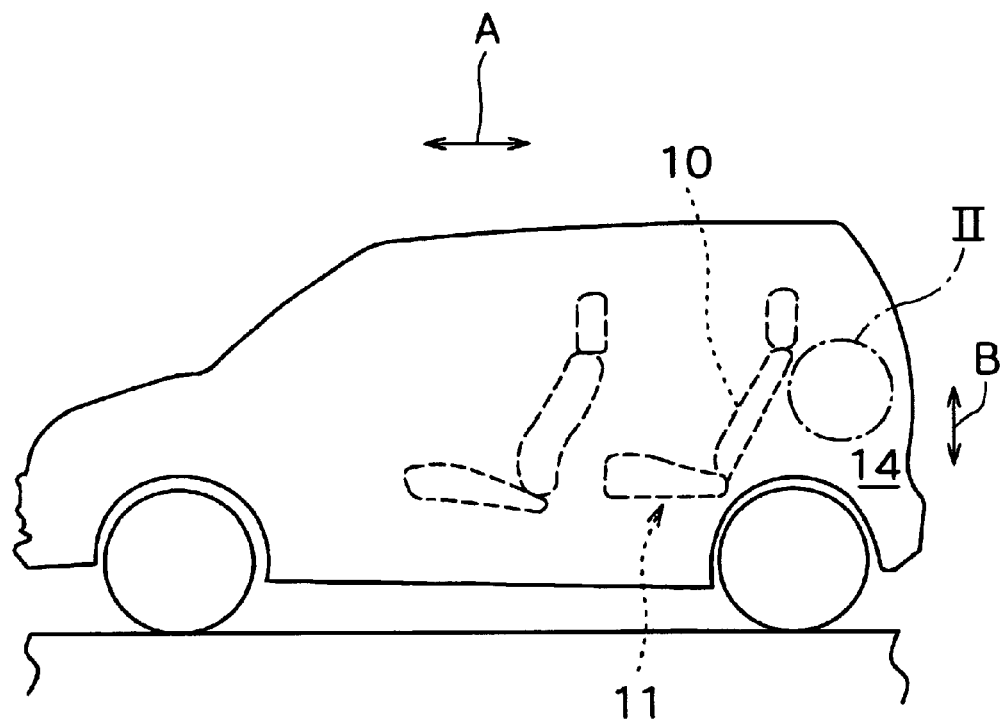
FIG. 1 is a side view schematically showing the positional relationship between an installation position of a bracket construction for a seat striker in accordance with one embodiment of the present invention and a seat on an automobile provided with the bracket construction.
Figure 2:
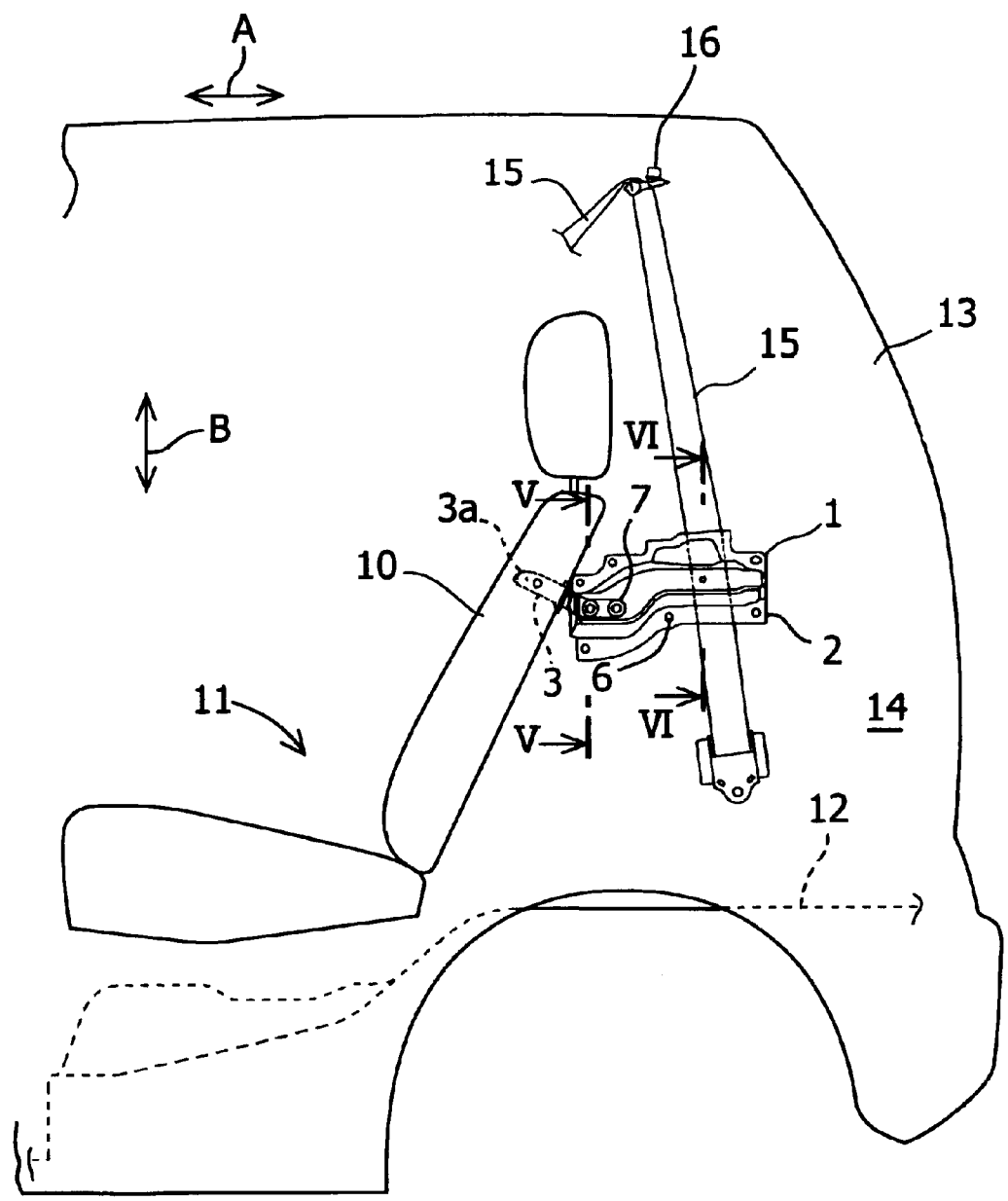
FIG. 2 is an enlarged schematic side view of portion II of FIG. 1, showing the positional relationship between a seat, a bracket, and a seat belt, with the illustration of a trim being omitted.
Figure 3:
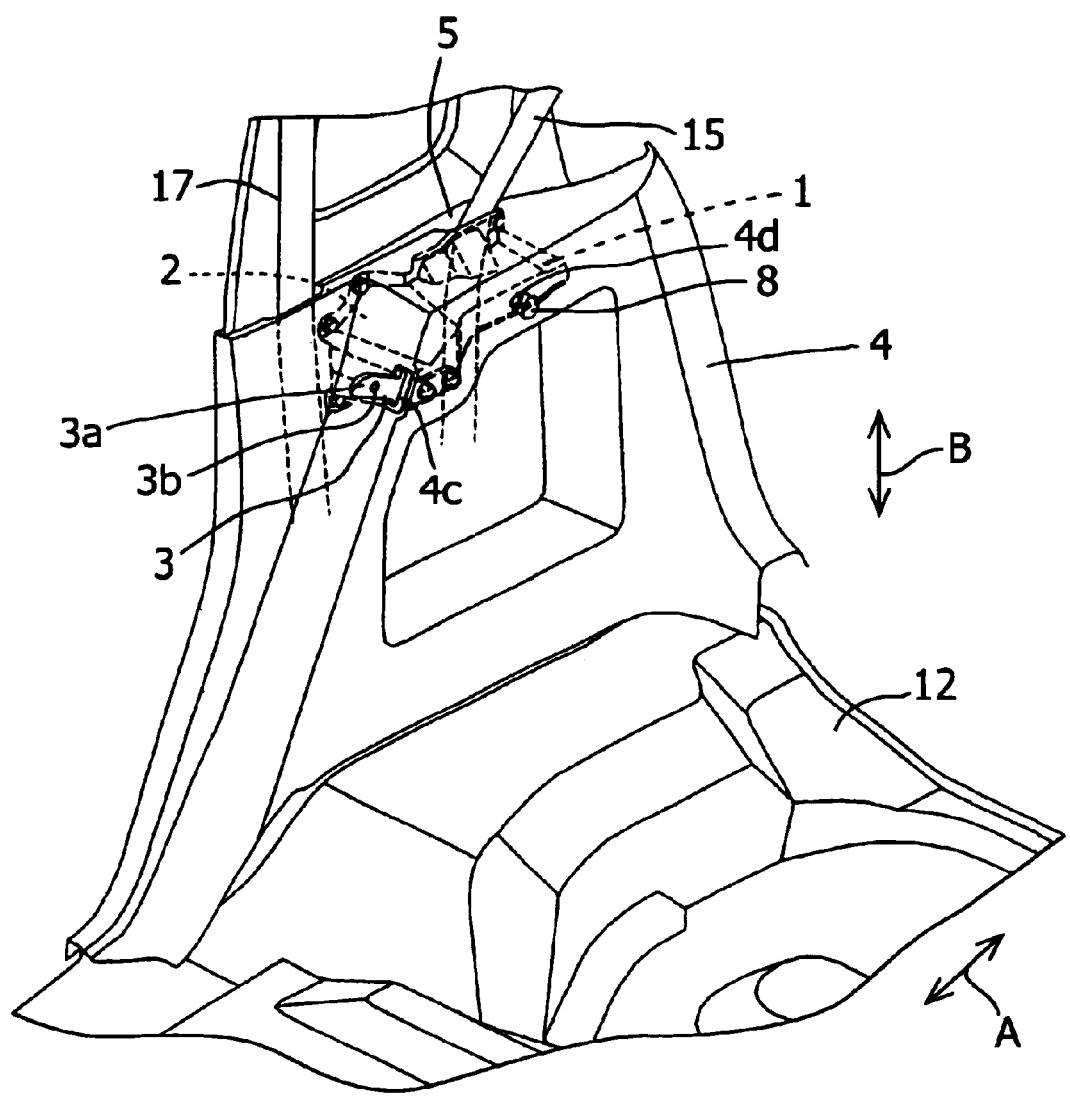
FIG. 3 is a partial perspective view of FIG. 2, in which a vehicle body and a trim are shown and a seat and the like are not shown.
Figure 7:
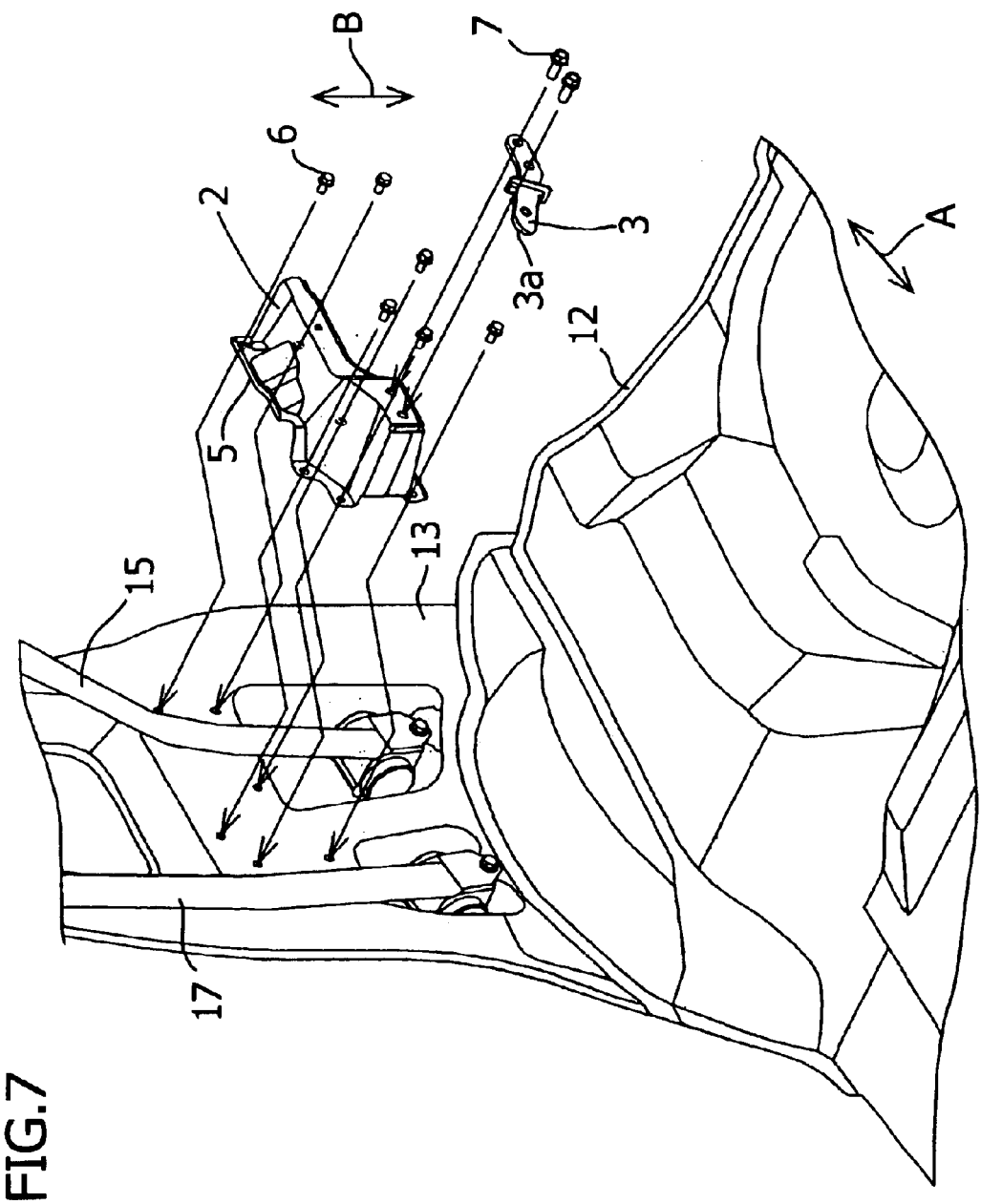
FIG. 7 is an exploded perspective view corresponding to the perspective view of FIG. 3, showing an assembling procedure for a bracket in accordance with the present invention.
Figure 8:
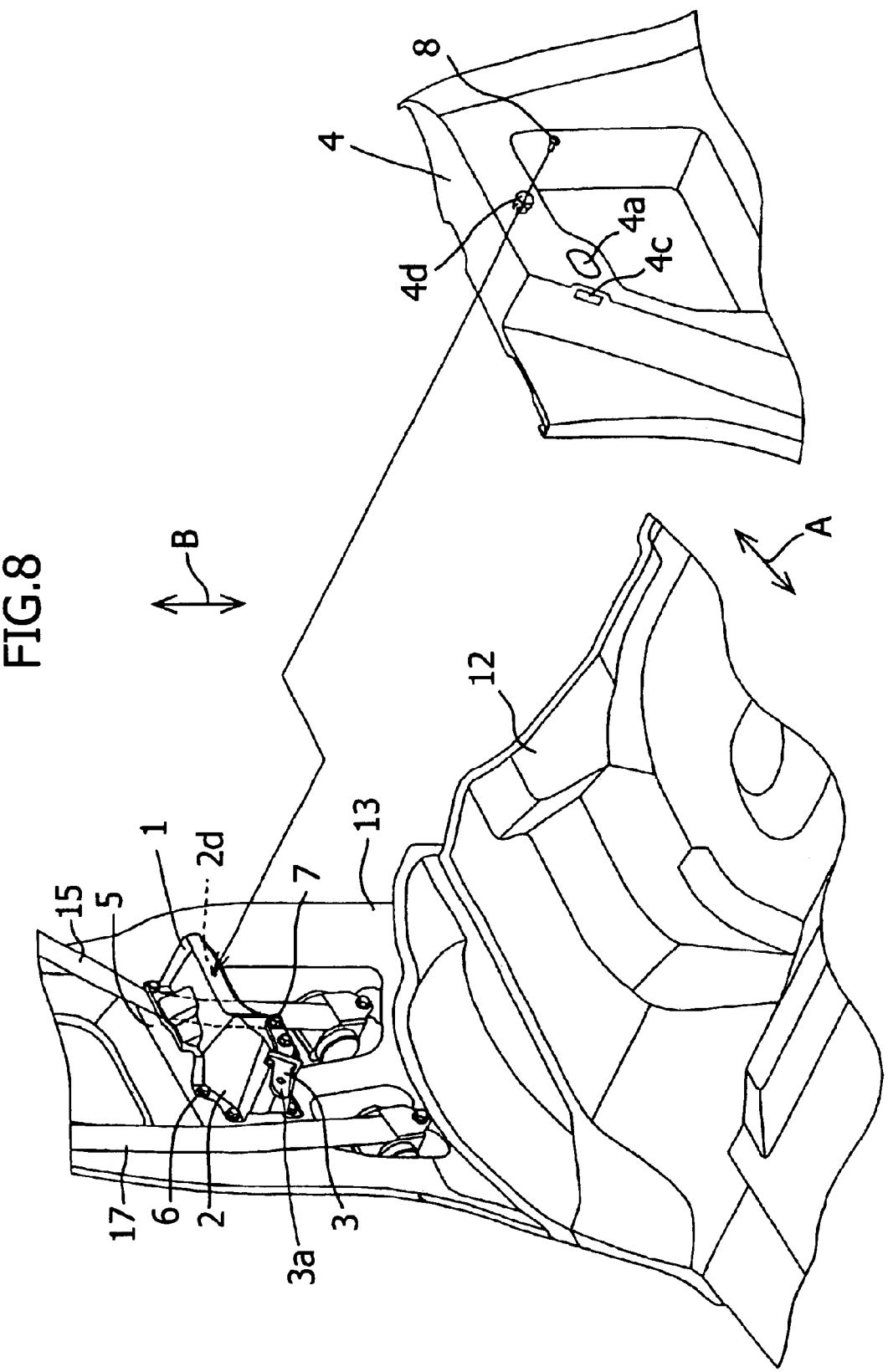
FIG. 8 is an exploded perspective view showing the assembling procedure after that shown in FIG. 7.
Figure 9:
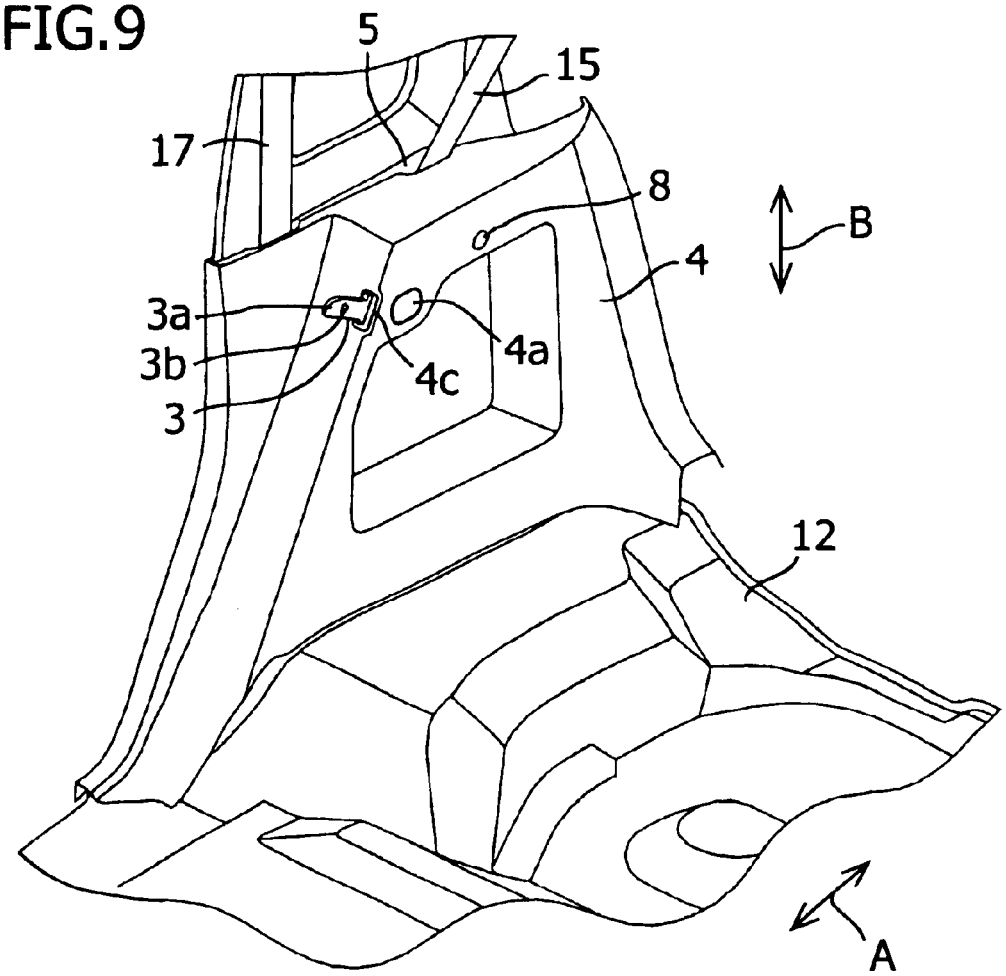
FIG. 9 is a perspective view showing a state in which the assembly of a bracket in accordance with the present invention has been completed.

An embodiment of a bracket construction for a seat striker in accordance with the present invention will now be described with reference to the accompanying drawings. As shown in FIG. 1, a bracket 1 is installed in a rear luggage section 14 located at the rear of a rear seat 11. As shown in FIG. 2, the rear luggage section 14 is defined by a floor panel 12 and a side panel (vehicle body side) 13. The bracket 1 has a bracket body 2 and a seat striker 3, and is installed to the side panel 13 with bolts 6. As shown in FIG. 3, the bracket body 2 and a part of the seat striker 3 are covered with a trim 4, and a tip end portion 3a of the seat striker 3 projects from the trim 4 (also see FIG. 9). As shown in FIG. 2, a seat belt 15, which is one for a rear center seat, passes through the bracket 1 via an anchorage 16 fixed to an upper part of the vehicle body. Although one seat belt 15 is shown in FIG. 2, in addition to the seat belt 15 for the rear center seat, a seat belt 17 for a rear window-side seat is also provided as shown in FIGS. 7 to 9.

Figure 4:
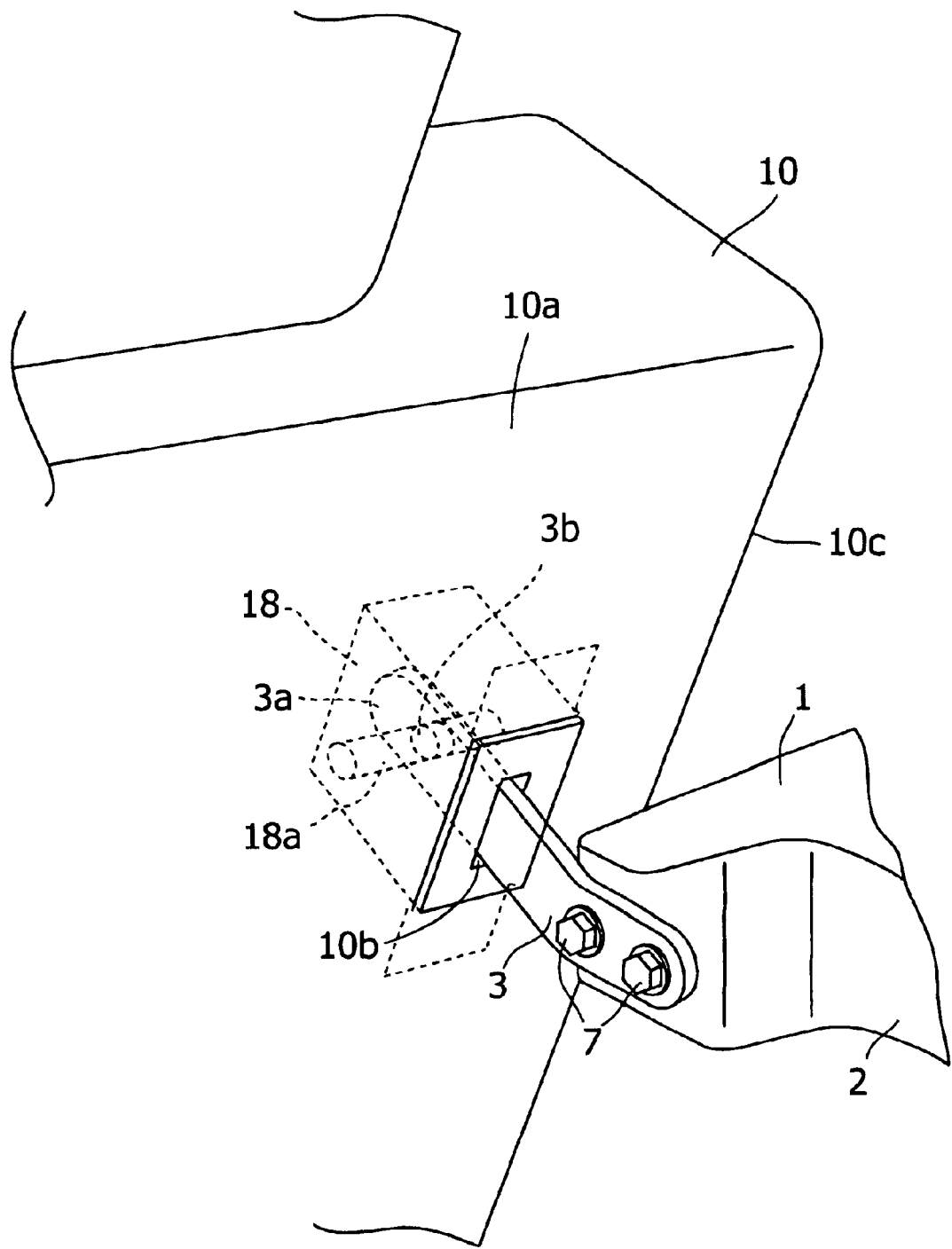
FIG. 4 is a perspective view showing the positional relationship between a squab of seat and a bracket in FIG. 2.
Figure 11:
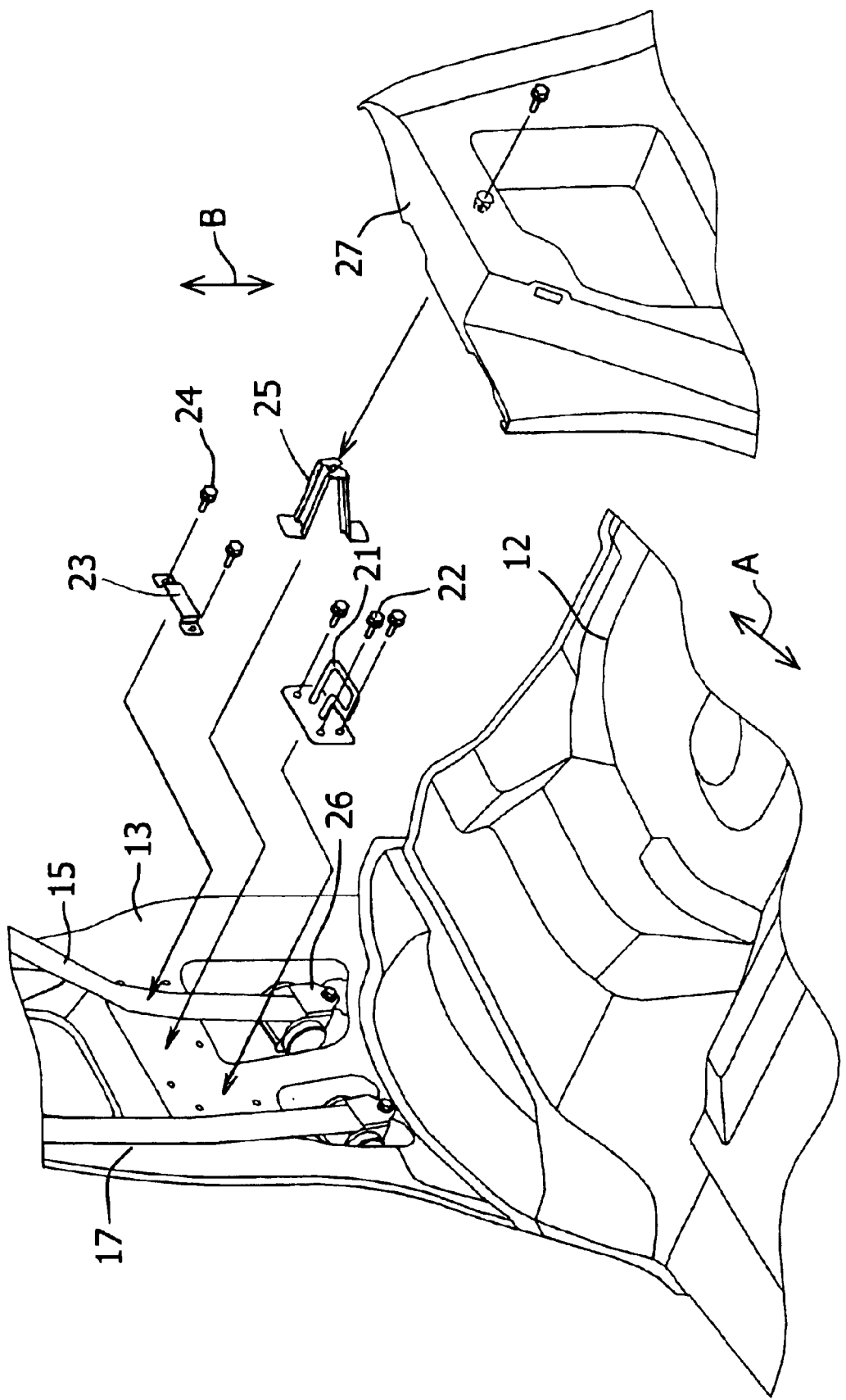
FIG. 11 is an exploded perspective view showing an assembling procedure for a bracket and the like relating to the present invention.

As shown in FIG. 2, the bracket body 2, which is larger than conventional ones (see FIG. 11) and is long in the vehicle longitudinal direction A, is provided so as to stride the seat belt 15 extending in the vertical direction B. The seat striker 3 is installed to the bracket body 2 with bolts 7 so that the tip end portion 3a thereof is directed toward the front of the vehicle. A squab 10 of the rear seat 11 is of a folding type and is constructed so that the seat striker 3 can be connected detachably to the squab 10. The folding type squab 10 can be fixed by the seat striker 3. Specifically, as shown in FIG. 4, in a back face 10a of the squab 10, a slot 10b is formed to receive the seat striker 3. A latch 18 is provided in the squab 10, and a pin 18a incorporated in the latch 18 is inserted in a hole 3b in the tip end portion 3a of the seat striker 3, by which the squab 10 is locked.

Figure 5:
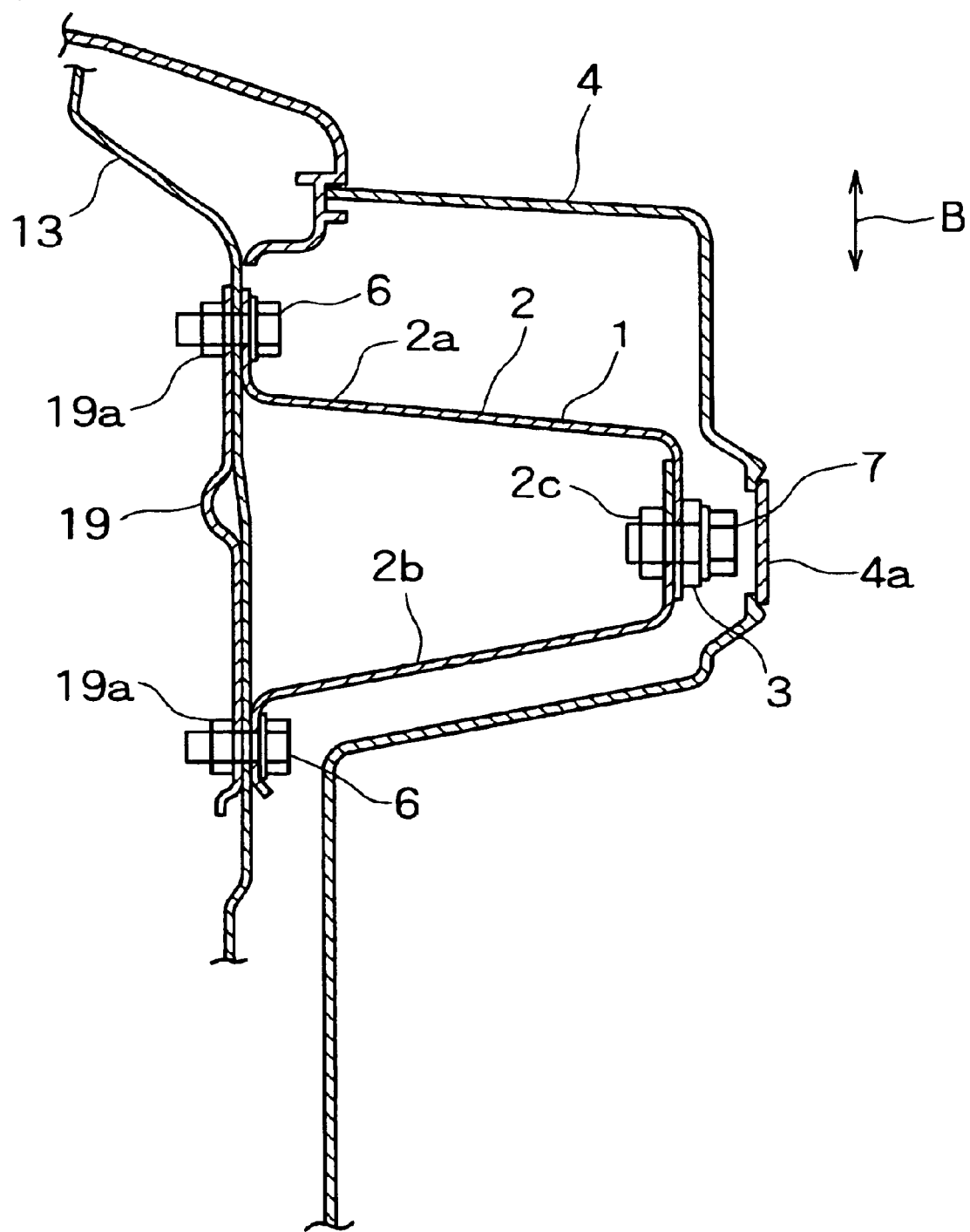
FIG. 5 is a sectional view taken along the line V—V of FIG. 2.
Figure 6:
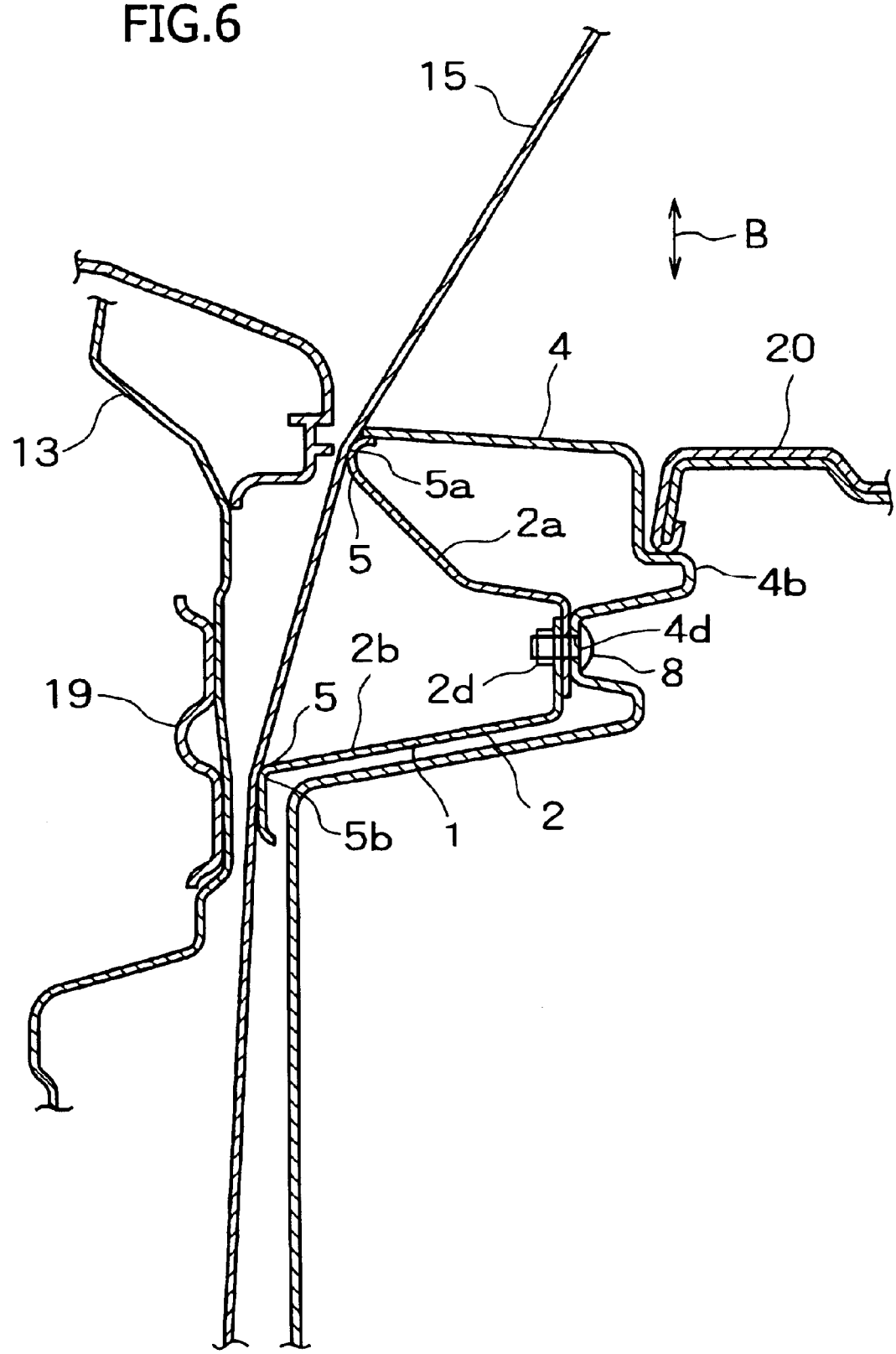
FIG. 6 is a sectional view taken along the line VI—VI of FIG. 2, showing the positional relationship between a side panel, a bracket, and a seat belt.

As shown in FIGS. 5 and 6, the bracket body 2 has a shape of considerably projecting toward the cabin side (right-hand side in the figures). More specifically, as shown in FIG. 4, the bracket body 2 extends further from the vehicle body than an outside end 10c of the squab 10. As shown in FIGS. 5 and 6, the bracket body 2 is made up of two members: an upper bracket (upper member) 2a and a lower bracket (lower member) 2b. At the time of assembling, the upper bracket 2a and the lower bracket 2b are integrated by joining them to each other by spot welding. Because of the use of this construction, despite of the fact that the bracket body 2 has a relatively large shape and thus has a high strength, the moldability thereof at the time of press molding is not decreased, and moreover the cost of press mold can be reduced.

As shown in FIG. 5, on the inner face side of the bracket body 2, nuts 2c used for the installation of the seat striker 3 are fixed. Also, a detachable cap 4a is provided on the trim 4 at a location corresponding to the nut installation locations. Even after the trim 4 has been mounted, only by removing the cap 4a, the bolts 7 can be retightened and thus the position of the seat striker 3 can be finely adjusted.

As shown in FIG. 5, on the back surface of the side panel 13, a reinforcement plate 19 and nuts 19a are provided. The bracket body 2 is installed at a place reinforced by the reinforcement plate 19, so that the bracket 1 can be held firmly on the vehicle body.

As shown in FIG. 6, the bracket body 2 has a nut 2d which is fixed on the inside side thereof to install the trim 4, so that the trim 4 can be fixed directly to the bracket body 2 with a screw 8. The trim 4 has a construction such as to be capable of supporting boards such as a shelf 20 by means of a shelf portion 4b.

As shown in FIG. 6, the bracket body 2 is provided with a seat belt guide portion 5. Specifically, the bracket 2 itself guides the seat belt 15. The seat belt guide portion 5, consisting of an upper guide 5a and a lower guide 5b, holds the seat belt 15 so as to prevent a phenomenon that a pulling force is applied to the seat belt and thereby the seat belt 15 is moved toward the cabin side. As shown in FIG. 7, on both sides of the seat belt guide portion 5, a bolted portion is located, so that the bracket body 2 has a construction such as to withstand a stronger shock given by the seat belt 15.

As shown in FIG. 6, the upper guide 5a and the lower guide 5b are formed into a flange shape such as to be bent in the direction such as to separate from the seat belt 15 and in the direction such that the tip end thereof separate from each other. A portion in which the seat belt 15 comes into contact with the seat belt guide portion 5 has a curved face of an arcuate shape in cross section, so that the seat belt 15 can be slid smoothly without being damaged.

Next, an assembling procedure will be described with reference to FIGS. 7 to 9. As shown in FIG. 7, the bracket body 2 is first installed to the side panel 13 with the bolts 6. Also, the seat striker 3 is installed to the bracket body 2 with the bolts 7. As shown in FIG. 8, the screw 8 is inserted into a mounting hole 4d in the trim 4 to install the trim 4 to the bracket body 2. The trim 4 is provided with a slot 4c, and as shown in FIG. 9, when the assembling work has been completed, the tip end portion 3a of the seat striker 3 projects from the slot 4c in the trim 4. In place of the above-described assembling procedure, another procedure as described below may be used: The bracket body 2 is installed to the side panel 13 with the bolts 6, and the screw 8 is inserted into the mounting hole 4d in the trim 4 to install the bracket body 2. Then the seat striker 3 is inserted through the slot 4c in the trim 4, and the seat striker 3 is installed to the bracket body 2 with bolts 7 through a mounting hole of the cap 4a. Finally, the cap 4a is assembled.

Figure 10:
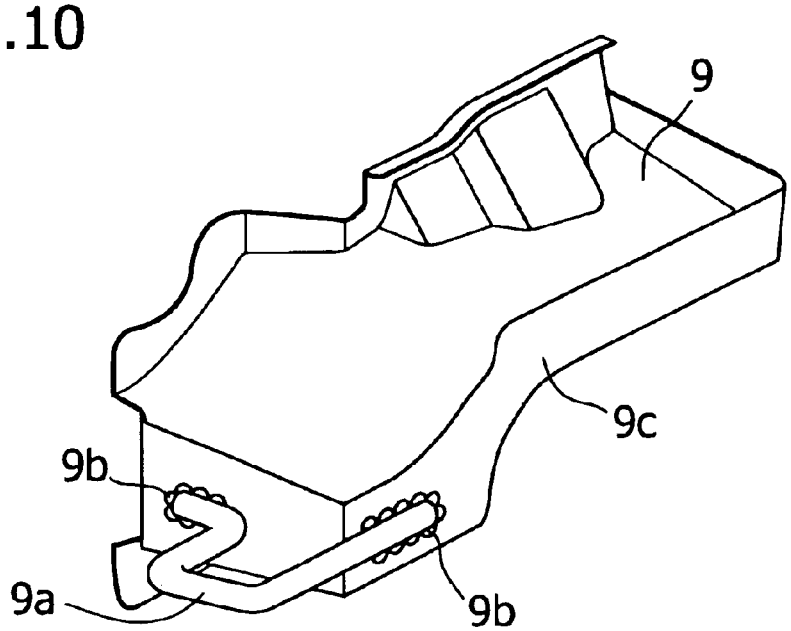
FIG. 10 is a perspective view of a bracket, showing one modification of the bracket shown in FIG. 2.

The present invention can be applied to not only a rear seat but also other seats, and also applied to other seat belts. Also, although the striker has a stick (plate) shape in the above-described embodiment, the present invention is not limited to this shape. For example, as shown in FIG. 10, in a bracket 9, a striker 9a, which is made by bending a steel round bar into a U shape, may be used. The connection of the striker 9a to a bracket body 9c and the connection of the bracket body 9c to the side panel 13 may be accomplished by weld 9b in place of bolting.

What is claimed is:

1. A bracket construction for a seat striker, which comprises a bracket body installed to a vehicle body side in a cabin and a seat striker installed to said bracket body, said seat striker being connected detachably to a folding type squab to fix said squab, wherein said bracket body extends further from the vehicle than an outside end of said squab and is long in the vehicle longitudinal direction, and wherein said bracket body has a seat belt guide portion.

2. The bracket construction for a seat striker according to claim 1, wherein said bracket body is formed by connecting an upper member and a lower member to each other.

3. The bracket construction for a seat striker according to claim 1, wherein said seat belt guide portion has an upper guide and a lower guide which are separated from each other in the lengthwise direction of said seat belt, and both of these guides can come into contact with said seat belt.

4. The bracket construction for a seat striker according to claim 3, wherein both of said upper guide and lower guide, which can come into contact with said seat belt, each have a flange shape bent, into an arcuate shape, to extend away from said seat belt.

5. The bracket construction for a seat striker according to any one of claims 1, 2, 3 or 4 wherein said bracket body is provided with a trim installation portion which covers said vehicle body side so that said trim covers said bracket body.

6. The bracket construction for a seat striker according to claim 1, wherein said seat belt guide portion has an upper guide and a lower guide which are separated from each other in the lengthwise direction of said seat belt, and both of these guides can come into contact with said seat belt.

7. The bracket construction for a seat striker according to claim 6, wherein both of said upper guide and lower guide, which can come into contact with said seat belt, each have a flange shape bent, into an arcuate shape, to extend away from said seat belt.

8. The bracket construction for a seat striker according to one of claim 6 or 7, wherein said bracket body is provided with a trim installation portion which covers said vehicle body side so that said trim covers said bracket body.

* * * * *